United States Patent
Murphy

(10) Patent No.: US 8,700,633 B1
(45) Date of Patent: Apr. 15, 2014

(54) DETERMINING CATEGORIES FOR GEOGRAPHIC DATA

(75) Inventor: Bruce W. Murphy, Pyrmont (AU)

(73) Assignee: Google Inc., Mountain View, CA (US)

(*) Notice: Subject to any disclaimer, the term of this patent is extended or adjusted under 35 U.S.C. 154(b) by 13 days.

(21) Appl. No.: 13/426,890

(22) Filed: Mar. 22, 2012

(51) Int. Cl.
*G06F 17/30* (2006.01)

(52) U.S. Cl.
USPC .......................................... 707/740; 707/748

(58) Field of Classification Search
USPC ........... 707/740, 737, 736, 999.001, 999.002, 707/999.003, 748, E17.089
See application file for complete search history.

(56) References Cited

U.S. PATENT DOCUMENTS 6,473,692 B2 * 10/2002 Hancock et al. .............. 701/409
6,845,241 B2 * 1/2005 Edlund et al. .............. 455/456.1
2007/0203868 A1 * 8/2007 Betz .................................. 706/50
2009/0005987 A1 * 1/2009 Vengroff et al. .............. 701/300
2012/0053991 A1 * 3/2012 Shimizu et al. .............. 705/7.34

* cited by examiner

*Primary Examiner* — Shiow-Jy Fan
(74) *Attorney, Agent, or Firm* — Fish & Richardson P.C.

(57) ABSTRACT

Methods, systems, and apparatus, including computer programs encoded on a computer storage medium, for determining categories for geographic data. In general, one aspect includes a method implemented by one or more processing devices that includes receiving, by one or more processors, geographic information data from a database, the geographic information data comprising location points and being divided into geographic areas, at least some of the geographic areas containing one or more location points, at least some of the location points being associated with at least one category, identifying, by one or more processors, for at least some of the geographic areas, a dominant category, based on categories associated with the location points contained within the geographic areas, and storing, by one or more processors, the dominant category in association with the respective geographic area in the database.

18 Claims, 7 Drawing Sheets

DETERMINING CATEGORIES FOR GEOGRAPHIC DATA

BACKGROUND

This subject matter of this specification relates to determining categories for geographic data.

The Internet facilitates easy access to on-line geographic data systems for millions of people. These on-line geographic data systems can provide information about geographic locations and the relationship between the geographic locations. For example, a mapping system may store data about geographic locations and allow a user to search for a particular location or location points associated with the geographic data. The geographic data can be displayed to the user in the form of a map or another graphical representation. Further, other data, such as advertisements, can be displayed with the geographic data.

SUMMARY

In general, one aspect can be implemented as a method that includes receiving, by one or more processors, geographic information data from a database, the geographic information data comprising location points and being divided into geographic areas, at least some of the geographic areas containing one or more location points, at least some of the location points being associated with at least one category, identifying, by one or more processors, for at least some of the geographic areas, a dominant category, based on categories associated with the location points contained within the geographic areas, and storing, by one or more processors, the dominant category in association with the respective geographic area in the database. Other aspects can include system, apparatus, and computer program products.

These and other implementations can each optionally include one or more of the following features. Identifying the dominant category includes calculating a total number of location points associated with each of a plurality of categories, and identifying as a dominant category a category associated with a number of location points greater than a threshold percentage of a number of location points associated with the respective geographic area. Calculating a total number of location points associated with each of a plurality of categories includes weighting each location point based on a prominence score associated with each respective location point. Calculating a total number of location points associated with each of a plurality of categories includes weighting each location point based on a category associated with the location point, the category identified as a category of interest to a user to whom the geographic information is to be displayed. Identifying the dominant category includes calculating a total number of location points associated with each of a plurality of categories at a first level of specificity, determining that none of the categories at the first level of specificity is a dominant category, calculating a total number of location points associated with each of a plurality of categories at a second level of specificity, and identifying a dominant category at a second level of specificity. The aspect includes choosing geographic information to display to a user, the geographic information representing a geographic location within a first geographic area; and choosing a content item for display to the user based at least in part on the dominant category associated with the first geographic area. Some of the geographic areas are contained within some of the other of the geographic areas, and the aspect further includes assigning the dominant category of a first geographic area to a second geographic area contained within the first geographic area.

Particular implementations of the subject matter described in this specification can be implemented so as to realize one or more of the following advantages. Content items, such as advertisements, can be chosen for a geographic area based on a dominant category for the geographic area.

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

A geographic information system can display content items, such as advertisements, alongside the geographic information. For example, if the geographic information system displays a map of a particular location, the geographic information system could also display advertisements relevant to the particular location. One way in which the geographic information system could choose advertisements is to choose them based on a type of commercial establishment popular in a particular location. For example, if the geographic information system displays a map of a location near a large number of restaurants, the geographic information system could also display advertisements for restaurants alongside the map. Geographic locations stored by the geographic information system could each be associated with a general category, such as restaurants, or a more specific category, such as sushi restaurants.

Figure 1:
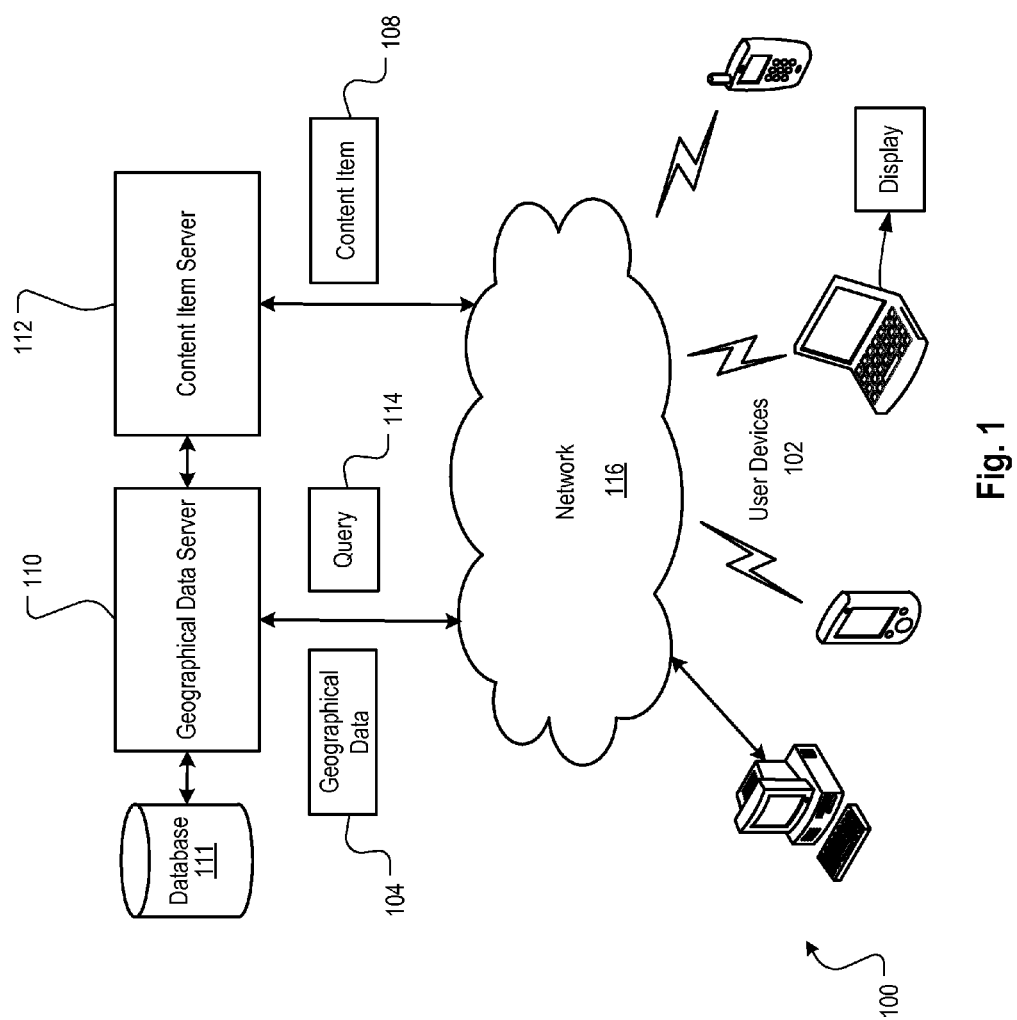
FIG. 1 is a block diagram of an example online environment.

FIG. 1 is a block diagram of an example online environment 100. The online environment 100 facilitates the serving of online resources for display on user devices 102. For example, online resources may include geographic data 104. Geographic data can be textual, graphical, or audiovisual, and can include the geographic location of a location point, a visual representation (such as a map) of a geographic area, or other kinds of geographic data that can be presented on a user device.

Geographic data 104 can be provided to user devices 102 through the network 116. The network 116 can be a wide area network, local area network, the Internet, or any other public or private network, or combination of both.

Geographic data 104 can be requested by a user device 102 from a geographic data server 110. In some implementations, geographic data 104 is requested as part of the delivery of a web page (not shown) provided by a web server, which may be the same entity as the geographic data server 110 or may be a different entity. For example, a web server can request the geographic data 104 from the geographic data server 110 and provide the geographic data 104 (incorporated within a web page) to a user device 102. In some examples, geographic data 104 is stored by the geographic data server 110 in a geographic database 111.

User devices 102 can receive information from the geographic data server 110 through the network 116 utilizing any device capable of communicating in a computer network environment and displaying retrieved information. Example user devices 102 include a web-enabled handheld device, a mobile telephone, a set top box, a game console, a personal digital assistant, a navigation device, or a computer.

In some implementations, geographic data 104 is provided in response to a search query 114. A user device 102 may transmit the search query 114 to the geographic data server 110 and receive geographic data 104 relevant to the search query 114 in response. For example, the search query 114 may be a street address and the geographic data 104 may be a map of the geographic region surrounding the street address.

Content items 108, such as advertisements, can be displayed on user devices 102 at the same time as geographic data 104 is displayed on the user devices 102. A content item server 112 provides the content items 108. For example, content items such as advertisements can be displayed in a web browser on a user device 102 alongside geographic data such as maps. In some examples, the content items 108 can be requested by the geographic data server 110 from the content item server 112 and delivered to the user devices 102 by the geographic data server 110 delivers geographic data 104. In some examples, a web server (not shown) retrieves geographic data 104 and content items 108 and delivers the geographic data 104 and content items 108 to the user devices 102. Other techniques for delivering geographic data 104 and content items 108 can be used.

In some implementations, content items 108 can be chosen based on geographic data 104 with which the content items 108 are delivered. For example, if the geographic data 104 includes a map of a geographic location such as a city, then the content items 108 can be chosen, for example, chosen by the content item server 112, based on location points in the city. The content items 108 could be advertisements for commercial establishments in the city, for example.

In some examples, location points in a geographic area, such as commercial establishments, are assigned a category or multiple categories describing the location point. The category can be included in the geographic data 104 and stored by the geographic data server 110. Content items 108 to be delivered with, and displayed with, geographic data 104 can be chosen based on categories assigned to location points represented in the geographic data 104. For example, content items 108 determined to be relevant to the categories can be chosen for delivery and display.

Figure 2A:
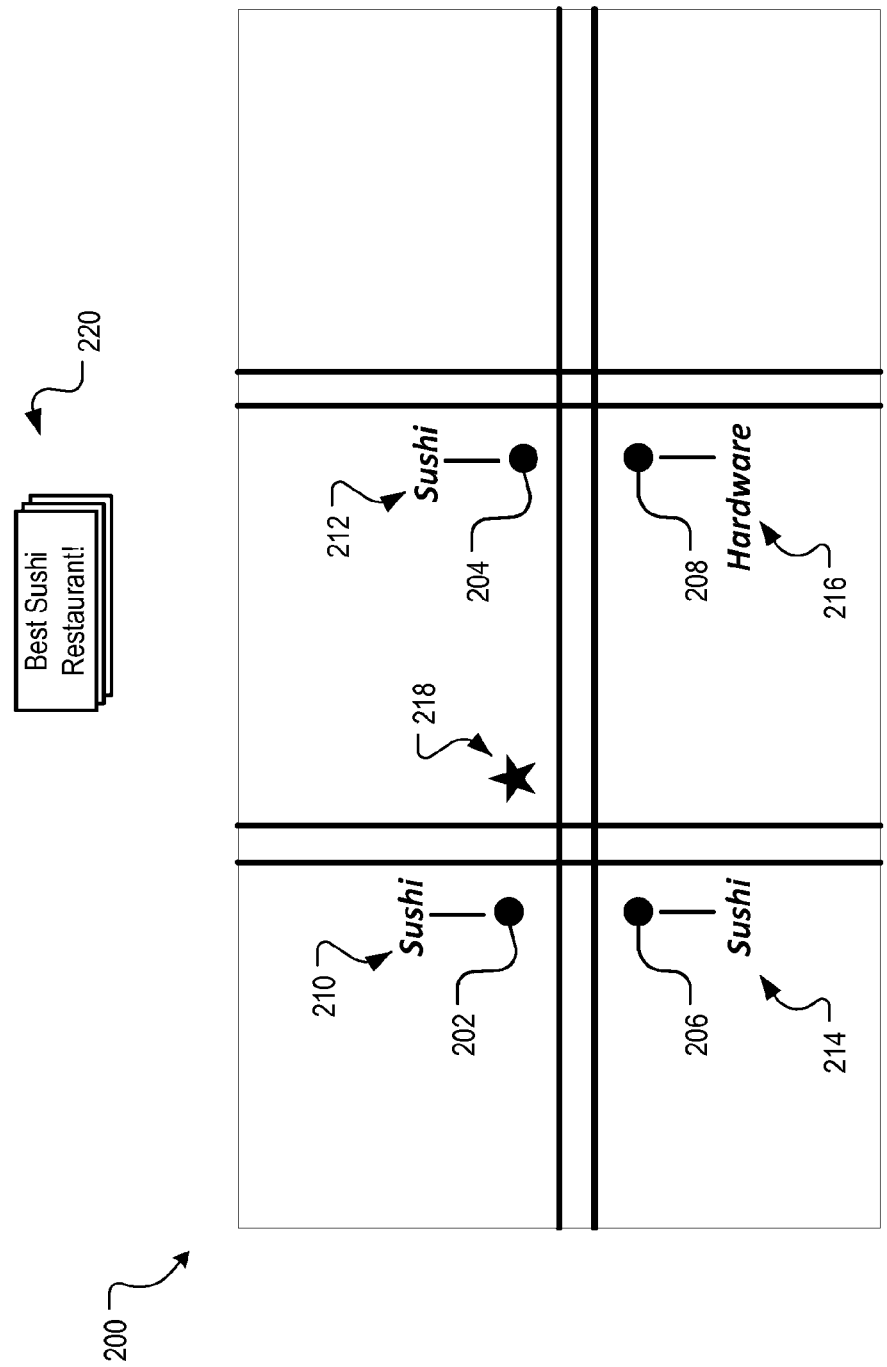
FIG. 2A shows an example representation of a geographic area containing location points each assigned a category.

FIG. 2A shows an example representation of a geographic area 200 containing location points each assigned a category. For example, the geographic area 200 may be a representation of geographic data such as the geographic data 104 shown in FIG. 1. The geographic area 200 may represent a geographic region such as a city or a town or a part of a city or town. The geographic area 200 includes four location points 202, 204, 206, 208. The location points may be defined in the geographic data represented by the geographic area 200. Each of the four location points 202, 204, 206, 208 is assigned a category 210, 212, 214, 216. The categories 210, 212, 214, 216 may be defined in the geographic data represented by the geographic area 200.

The geographic area 200 can be chosen based on a location of interest to a user. For example, a user of a user device may view a map of the geographic area 200, for example, by entering a street address 218, represented in FIG. 2A as a star. When the user is viewing the map of the geographic area 200, the map may be centered around the street address 218. The street address 218 may or may not be shown as a graphical element in the map. In some examples, the street address 218 is submitted as a search query 114 as shown in FIG. 1.

In the example shown, the four location points 202, 204, 206, 208 are commercial establishments located on streets of a city represented by the geographic area 200. Three of the location points 202, 204, 206 are sushi restaurants and the fourth location point 208 is a hardware store. The category 210, 212, 214 for the first three location points 202, 204, 206 is "Sushi" and the category 216 for the fourth location point 208 is "Hardware." Because the most frequently represented category 210, 212, 214, 216 among the location points 202, 204, 206, 208 is "Sushi," "Sushi" can be said to be the dominant category for the geographic area 200. For example, the geographic data server 110 (FIG. 1) may determine a dominant category for the geographic area 200. The dominant category for a geographic area may be determined according to one of several techniques. In some examples, the dominant category is a category represented among the greatest number of location points in the geographic area. In some examples, the dominant category is a category represented among a majority of the location points in the geographic area. In some examples, the dominant category is a category represented among a threshold percentage of location points in the geographic area, for example, 60% or more of location points. Other techniques may be used.

The categories 210, 212, 214, 216 assigned to the location points 202, 204, 206, 208 can be used to select one or more content items 220 to be displayed when the geographic area 200 is displayed. For example, if the geographic area 200 is displayed as a map in a web page on a user device, such as one of the user devices 102 shown in FIG. 1, then content items 220 can be displayed in the same web page. In some implementations, each content item 220 is associated with one or more categories. For example, the content items 220 may be stored in association with one or more categories by the content item server 112 shown in FIG. 1. In some example, each content item 220 is associated with one or more keywords. Keywords may be words representative of content of a content item. In some implementations, the content item server 112 determines keywords for each content item. For example, if a content item 220 contains the phrase "Best Sushi Restaurant" then words such as "sushi" and "restaurant" may be determined to be keywords for the content item 220. In some examples, keywords are determined by a creator of a content item 220, for example, an advertiser who created a content item 220. For example, a creator of a content item 220 that is an advertisement for sushi restaurants may identify "sushi" and "restaurant" as keywords for the content item 220.

In some examples, the content items 220 can be chosen based on a dominant category of the geographic area 200. For example, if a keyword or category of a content item 220 matches the dominant category of the geographic area 200 then the content item 220 can be chosen for display with the geographic area. A keyword or category of a content item 220 matches the dominant category of the geographic area 200 if the keyword or category of the content item 220 is relevant to the dominant category of the geographic area 200. For example, if the dominant category of the geographic area 200 is "Sushi," then a content item 220 that has a category or keyword of "sushi" or "sushi restaurant" or "sushi roll" or "nigiri" matches the dominant category of the geographic area 200.

Thus, content items 220 can be chosen that are relevant to the location points 202, 204, 206, 208 in a particular geographic area 200 based on the categories of the location points 202, 204, 206, 208. Referring to FIG. 1, if a user device 102 submits a search query 114 containing a street address 218 to the geographic data server 110, then a content item 108 can be chosen to be delivered to the user device 102 based on a dominant category of the geographic area 200 containing the street address 218.

In some examples, the dominant category for a geographic area 200 can be determined when a request for geographic data representing the geographic area 200 is received. For example, if a user device makes a request for a geographic area 200 based on a street address 218 located within the geographic area 200 then a geographic data server 110 (FIG. 1) can determine the dominant category at the time of the request. In some examples, the dominant category for a geographic area 200 can be determined at a time other than when a request for geographic data representing the geographic area 200 is received. For example, a geographic data server 110 (FIG. 1) can determine dominant categories for geographic areas 200 at regular intervals, for example, once a day or once an hour or any other regular or irregular interval of time. In some implementations, a dominant category for a geographic area 200 can be stored in association with the geographic area 200. For example, a dominant category for a geographic area 200 can be stored by a geographic data server 110 (FIG. 1) in association with data representing the geographic area 200.

Figure 2B:
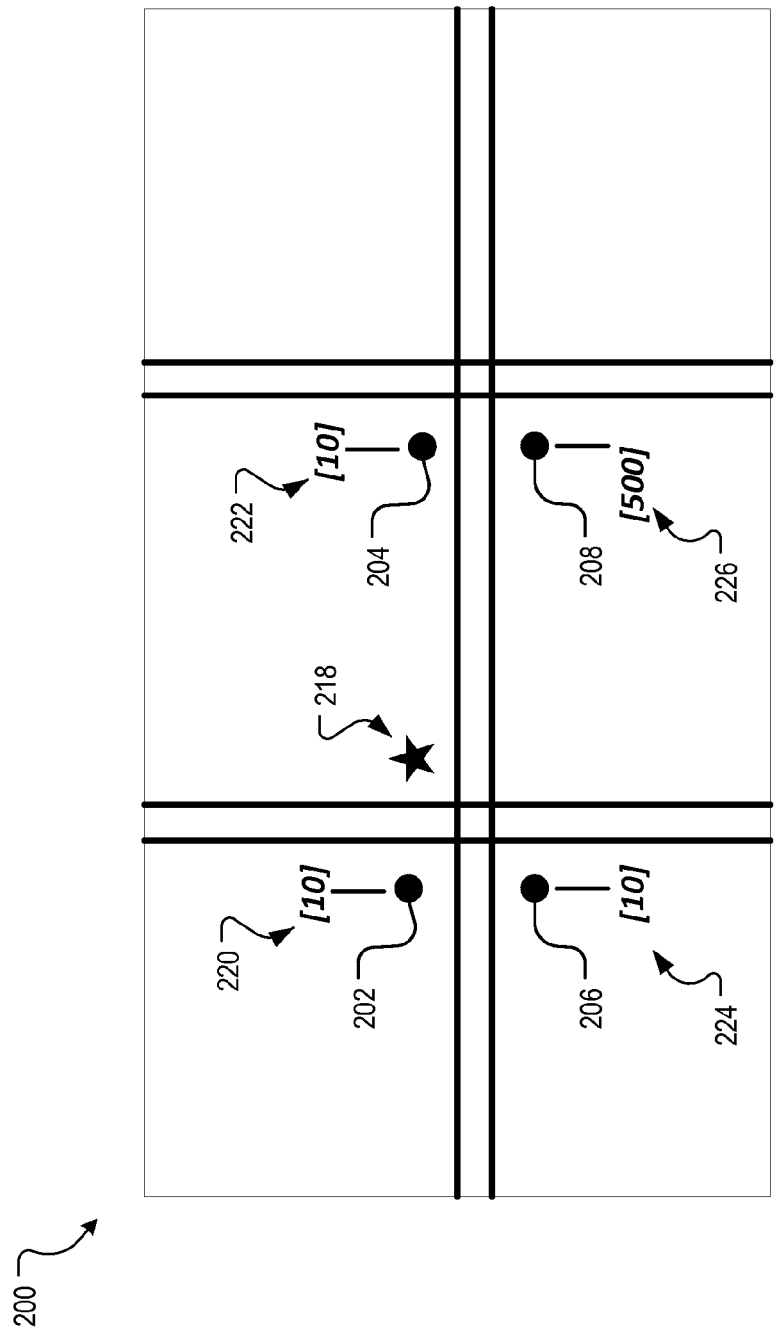
FIG. 2B shows an example representation of a geographic area in which each location point is assigned a weight.

FIG. 2B shows an example representation of a geographic area in which each location point is assigned a weight. A weight can be used to place a greater or lesser importance to a category of a location point when the dominant category for a geographic area is determined.

In some examples, a particular location point may represent a commercial establishment that is popular by one or more metrics of popularity. The popularity of the location point can be quantified in the form of a prominence score. For example, a commercial establishment that receives a large number of annual visitors relative to other commercial establishments in the geographic area may be assigned a prominence score having a numerical value greater than prominence scores assigned to the other commercial establishments in the geographic area. In some examples, the prominence scores can be used as the weights for the location points. In some examples, the prominence scores can be used to calculate the weights for the location points.

In some examples, a user may have identified one or more categories of interest. For example, a user using one of the user devices 102 shown in FIG. 1 may have a user profile indicating the categories of interest. The user profile may be stored by the geographic data server 110 shown in FIG. 1 or the user profile may be otherwise accessible to the geographic data server 110. In some examples, the categories of interest can be used to calculate the weights for the location points. For example, one or more of the categories of interest may be among the categories assigned to some of the location points. Those categories can be assigned a weight having a numerical value higher than categories not among the user's categories of interest. In this way, categories of interest among the location points are weighted higher than other categories. When using this technique, a category of interest for a geographic area is determined at the time at which a user accesses geographic data representing a particular geographic area.

In some examples, a weight can be a numerical value, and in some examples, a weight can be another kind of value. In the geographic area 200 shown, three of the location points 202, 204, 206 are assigned weights 220, 222, 224 each having a numerical value of [10], and one of the location points 208 is assigned a weight 226 having a numerical value of [500]. The weights 220, 222, 224, 226 can be used in the determination of the dominant category for the geographic area. In some implementations, the numerical values for the weights assigned to location points for each category within a geographic area can be added together, and the category having the greatest aggregate numerical value can be chosen as the dominant category. For example, referring to FIG. 2A, the first three location points 202, 204, 206 have a category of "Sushi" and their weights 220, 222, 224 added together total thirty. The other location point 208 is the only one having a category of "Hardware" and its weight 226 is five hundred. Because five hundred is greater than thirty, the dominant category for this geographic area 200 is chosen to be "Hardware."

In some examples, a dominant category of a geographic area will not be a category of any of the location points contained in the geographic area. For example, sometimes none of the categories of the location points are represented in sufficient number among the location points to be a dominant category on its own. Other techniques can be used to determine a dominant category for the geographic area other than choosing a category assigned to any of the location points.

Figure 3A:
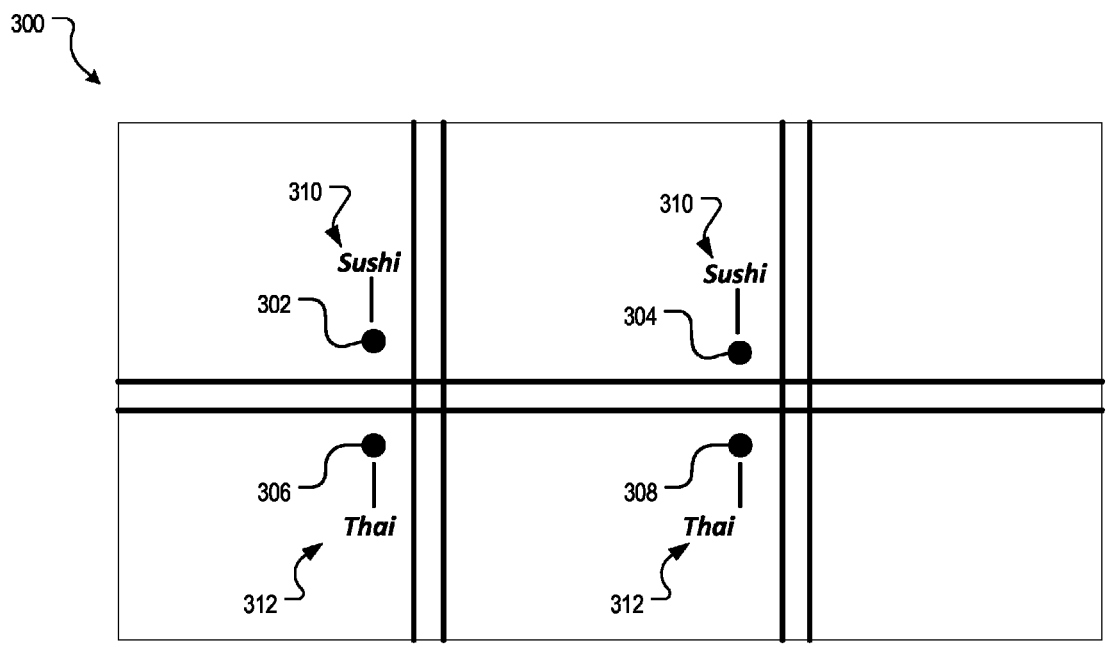
FIG. 3A shows an example representation of a geographic area containing location points each assigned a category.

FIG. 3A shows an example representation of a geographic area 300 containing location points each assigned a category. For example, the geographic area 300 may be a representation of geographic data such as the geographic data 104 shown in FIG. 1. This geographic area 300 includes four location points 302, 304, 306, 308. Two of the location points 302, 304 have a category 310 of "Sushi" and two of the location points 306, 308 have a category 312 of "That." In this example, the two categories 310, 312 are represented among equal numbers of the location points 302, 304, 306, 308. One technique for determining a dominant category for this geographic area 300 is to consult a hierarchy of categories to determine if multiple categories represented among the location points belong to a more general category. A more general category could be used as the dominant category for the geographic area. This technique could be used for geographic areas in which no category is represented among a majority of the location points.

Figure 3B:
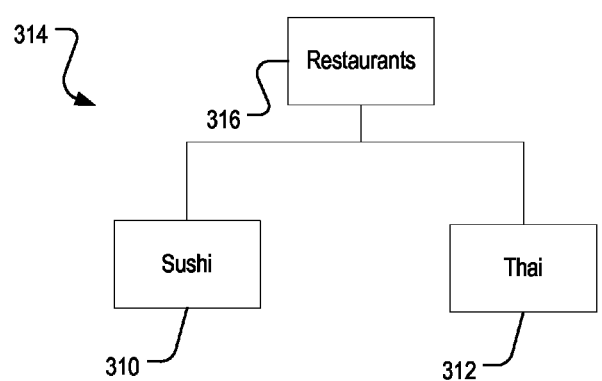
FIG. 3B shows an example of a category hierarchy.

FIG. 3B shows an example of a category hierarchy 314. The category hierarchy 314 defines relationships among categories 310, 312, 316 such as the categories assigned to location points in a geographic area. In some implementations, the category hierarchy 314 is stored by the geographic data server 110 shown in FIG. 1. The categories 310, 312, 316 can be arranged according to specificity. For example, one category 310 can be a more specific version of another category 316, and so the more specific category 310 can be placed below the more general category 316 in the hierarchy.

The category hierarchy 314 shown in FIG. 3B can be used to determine a dominant category for the geographic area 300 shown in FIG. 3A. According to the category hierarchy 314, both categories 310, 312 associated with the location points 302, 304, 306, 308 of the geographic area 300 are specific categories included within a more general category 316, "Restaurants." The more general category 316 can be used as the dominant category for the geographic area 300. In some implementations, the geographic data server 110 shown in FIG. 1 consults the category hierarchy 314 to determine a category 316 that includes categories 310, 312 associated with at least a majority of the location points 302, 304, 306, 308 of the geographic area 300 or another threshold number of the location points. For example, the geographic data server 110 can calculate the number of location points associated with the more general category 316 to determine if the category meets a threshold for a dominant category. The geographic data server 110 can then associate the general category 316 with the geographic area 300 as the dominant category of the geographic area.

Figure 4:
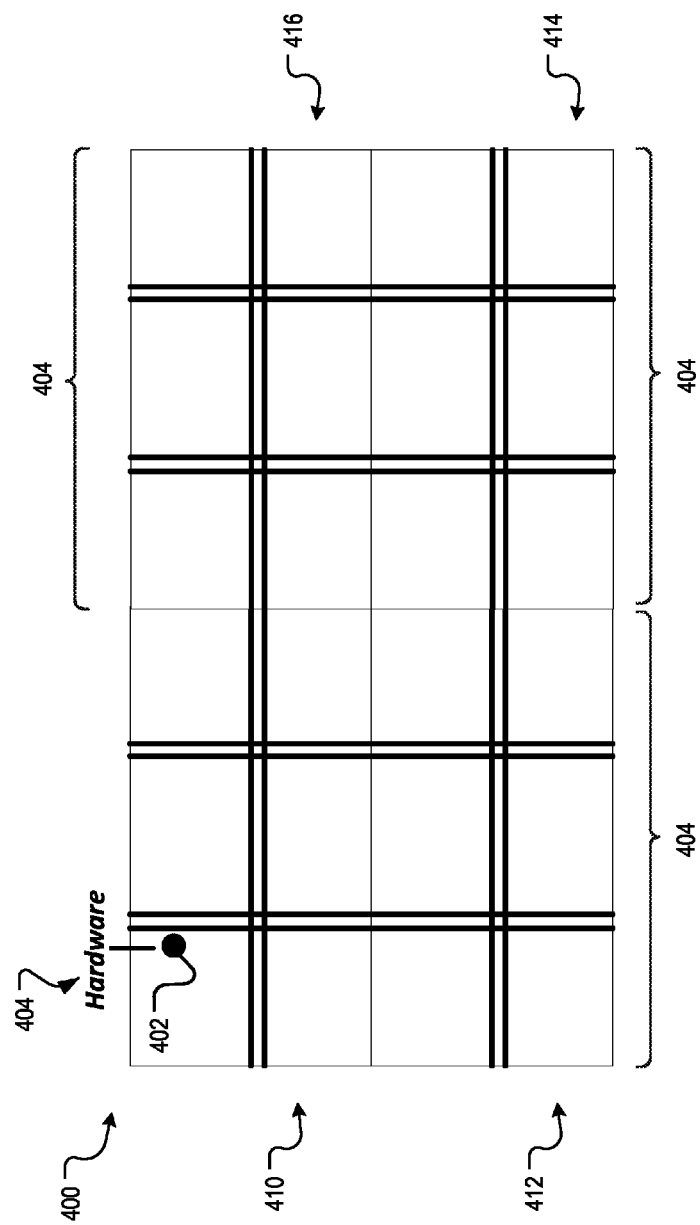
FIG. 4 shows an example representation of a geographic area adjacent to other geographic areas.

FIG. 4 shows an example representation of a geographic area 410 adjacent to other geographic areas 412, 414, 416. The geographic areas 410, 412, 414, 416 are all contained within a larger geographic area 400. In some examples, the dominant category of one geographic area 410 can be used as the dominant category for other geographic areas 412, 414, 416. For example, if one geographic area has few location points, such as a geographic area in a sparsely populated area, then the dominant category of an adjacent geographic area can be used as the dominant category for the first geographic area.

In the example shown in FIG. 4, one geographic area 410 has a single location point 402. The single location point is assigned a category 404 of "Hardware," indicating that it is a hardware store. The geographic area 410 can be assigned the category 404 as its dominant category. For example, a geographic data server 110 as shown in FIG. 1 can determine that the category 404 of "Hardware" is the only category represented in the geographic area 410 and is therefore the dominant category.

The geographic area 410 is located within a larger geographic area 400. None of the other geographic areas 412, 414, 416 within the larger geographic area 400 contain any location points. Thus, a dominant category cannot be determined for the other geographic areas 412, 414, 416 using location points. The dominant category 404 of the geographic area 410 containing the location point 402 can be assigned to the larger geographic area 400. For example, the geographic data server 110 can store the dominant category 404 in association with the geographic area 410 containing the location point 402 and also store the dominant category 404 in association with the larger geographic area 400. If a dominant category is needed for any of the other geographic areas 412, 414, 416, then the dominant category 404 associated with the larger geographic area 400 can be used.

In some examples, this technique can be used in other scenarios in which a geographic area has no dominant category. For example, a geographic area may contain location points, but there may be no category among the categories assigned to the location points that meets a threshold for determining a dominant category. In these examples, a dominant category for an adjacent geographic area or an enclosing geographic area can be used as the dominant category for the geographic area.

Figure 5:
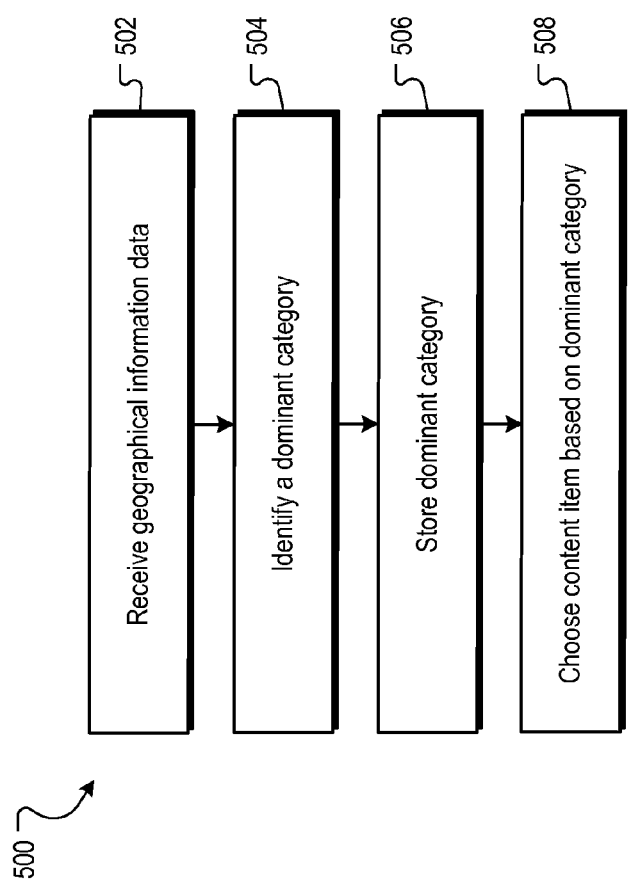
FIG. 5 is a flowchart of an example process for determining and storing a dominant category for a geographic area.

FIG. 5 is a flowchart of an example process 500 for determining and storing a dominant category for a geographic area. The process 500 can be used, for example, in the geographic data server 110, or another processing device or combination of processing devices.

Geographic information data is received from a database (502). For example, the database can be the geographic database 111 shown in FIG. 1. In some implementations, the geographic information data includes location points and is divided into geographic areas. Some of the geographic areas can contain one or more location points, and the location points can be associated with one or more categories. A location point may be a commercial establishment and a category can describe the location point. Some geographic areas may be contained within other geographic areas.

A dominant category is identified for some of the geographic areas (504). The dominant category can be identified based on categories associated with the location points contained within the respective geographic area. The dominant category may be one of the categories associated with the location points, or the dominant category may be another category not associated with the location points.

In some implementations, identifying a dominant category includes calculating a total number of location points associated with each of a plurality of categories, and identifying as a dominant category a category associated with a number of location points greater than a threshold percentage of a number of location points associated with the respective geographic area. For example, a category associated with a majority of the location points within a geographic area may be identified as a dominant category. In some examples, the total number of location points associated with each of a plurality of categories is calculated by weighting each location point based on a prominence score associated with each respective location point. In some examples, calculating a total number of location points associated with each of a plurality of categories comprises weighting each location point based on a category associated with the location point. The category can be one identified as a category of interest to a user to whom the geographic information is to be displayed.

In some implementations, identifying a dominant category includes calculating a total number of location points associated with each of a plurality of categories at a first level of specificity and determining that none of the categories at the first level of specificity is a dominant category. In this case, a total number of location points associated with each of a plurality of categories at a second level of specificity can be calculated, and a dominant category can be identified at a second level of specificity. For example, a hierarchy of categories in which the categories are arranged according to levels of specificity can be used. One example of a category hierarchy 314 is shown in FIG. 3B.

The dominant category is stored in association with the respective geographic area in the database (506). For example, the dominant category can be stored in the geographic database 111 shown in FIG. 1. In some implementations, the dominant category of a first geographic area to a second geographic area contained within the first geographic area.

In some implementations, the process 500 can include other operations. For example, geographic information may be chosen for display to a user. The geographic information can represent a geographic location within a geographic area. A content item can then be chosen for display to the user based at least in part on the dominant category associated with the first geographic area (508). For example, the content item can be a content item 108 received from a content item server 112 as shown in FIG. 1.

Figure 6:
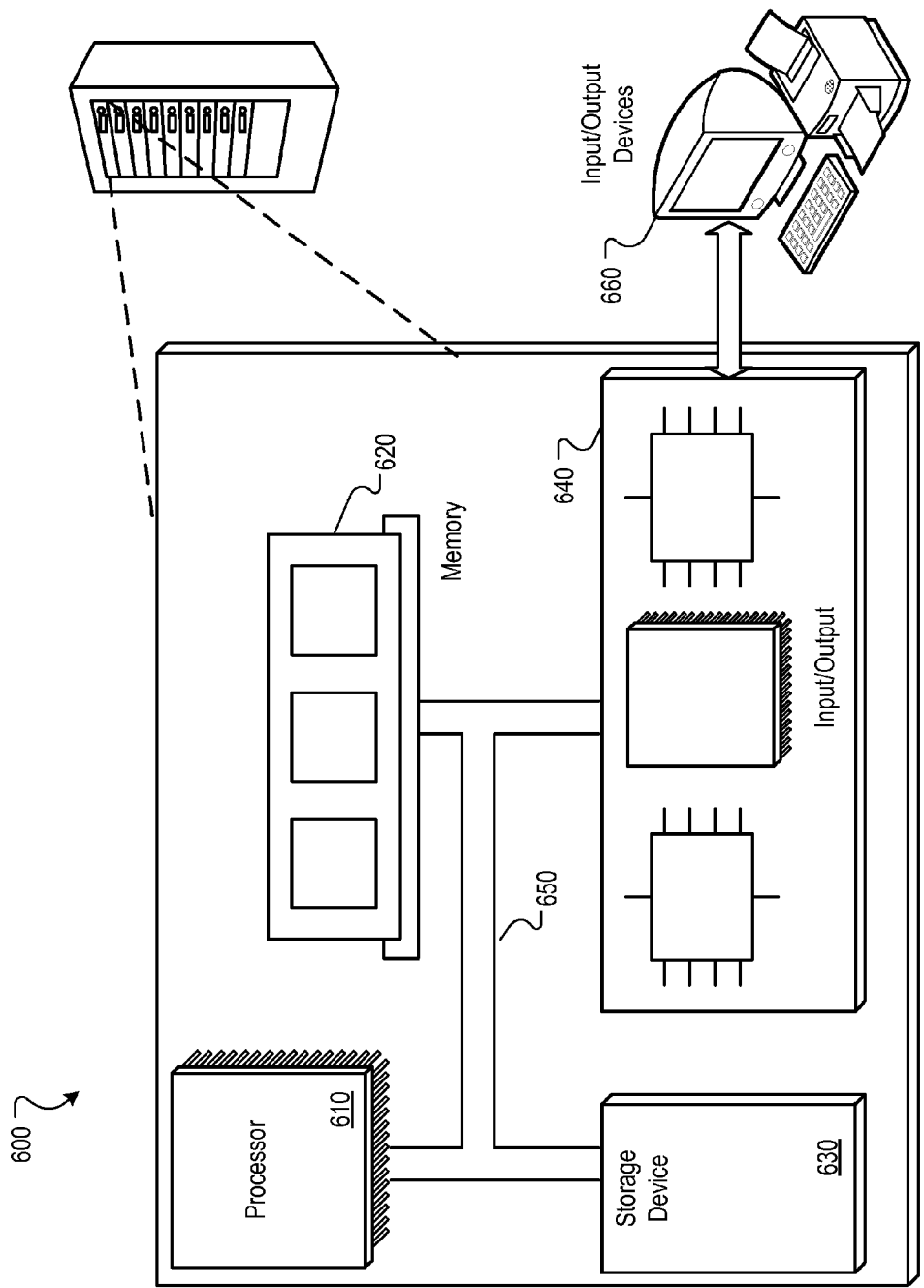
FIG. 6 is block diagram of an example computer system that can be used to facilitate determining categories for geographic data.

FIG. 6 is block diagram of an example computer system 600 that can be used to facilitate determining categories for geographic data. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, or some other large capacity storage device.

The input/output device 640 provides input/output operations for the system 600. In one implementation, the input/output device 640 can include one or more of a network interface devices, e.g., an Ethernet card, a serial communication device, e.g., an RS-232 port, and/or a wireless interface device, e.g., and 802.11 card. In another implementation, the input/output device can include driver devices configured to receive input data and send output data to other input/output devices, e.g., keyboard, printer and display devices 660. Other implementations, however, can also be used, such as mobile computing devices, mobile communication devices, set-top box television client devices, etc.

The web server and geographic data server can be realized by instructions that upon execution cause one or more processing devices to carry out the processes and functions described above. Such instructions can comprise, for example, interpreted instructions, such as script instructions, e.g., JavaScript or ECMAScript instructions, or executable code, or other instructions stored in a computer readable medium. The web server and geographic data server can be distributively implemented over a network, such as a server farm, or can be implemented in a single computer device.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier for execution by, or to control the operation of, a processing system. The computer readable medium can be a machine readable storage device, a machine readable storage substrate, a memory device, a composition of matter effecting a machine readable propagated signal, or a combination of one or more of them.

The term "processing system" encompasses all apparatus, devices, and machines for processing data, including by way of example a programmable processor, a computer, or multiple processors or computers. The processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non volatile storage devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

Implementations of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet. The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims.

What is claimed is:

1. A method implemented by one or more processing devices, comprising:
   receiving, by one or more processors, geographic information data from a database, the geographic information data comprising location points and being divided into geographic areas, at least some of the geographic areas containing one or more location points, at least some of the location points being associated with at least one category;
   calculating, by one or more processors, for at least some of the geographic areas, a total number of location points associated with each of a plurality of categories at a first level of specificity in a predetermined hierarchy of categories that defines relationships among categories, the categories in the hierarchy of categories arranged according to specificity where the first level of specificity is more specific than a second level of specificity in the hierarchy of categories;
   determining, by one or more processors, that none of the categories at the first level of specificity is a first dominant category based on each of the categories at the first level of specificity corresponding with a quantity of location points that is not greater than a first threshold percentage of location points associated with the respective geographic area;
   calculating, by one or more processors and based on determining that none of the categories at the first level of specificity is a first dominant category, for at least some of the geographic areas, a total number of location points associated with each of a plurality of categories at the second level of specificity in the hierarchy of categories;
   identifying, by one or more processors and based on determining that none of the categories at the first level of specificity is a first dominant category, a second dominant category at the second level of specificity based on the location points associated with each of the categories at the second level of specificity, the second dominant category from the categories at the second level of specificity and corresponding with a quantity of location points greater than a second threshold percentage of location points associated with the respective geographic area; and
   storing, by one or more processors, the second dominant category in association with the respective geographic area in the database.

2. The method of claim 1, wherein calculating a total number of location points associated with each of a plurality of categories at the second level of specificity comprises weighting each location point based on a prominence score associated with each respective location point.

3. The method of claim 1, wherein calculating a total number of location points associated with each of a plurality of categories at the second level of specificity comprises weighting each location point based on a category associated with the location point, the category identified as a category of interest to a user to whom the geographic information is to be displayed.

4. The method of claim 1, further comprising
   choosing geographic information to display to a user, the geographic information representing a geographic location within a first geographic area; and
   choosing a content item for display to the user based at least in part on the dominant category associated with the first geographic area.

5. The method of claim 1, wherein some of the geographic areas are contained within some of the other of the geographic areas, and further comprising assigning the dominant category of a first geographic area to a second geographic area contained within the first geographic area.

6. The method of claim 1, wherein the second threshold percentage is sixty percent.

7. A system, comprising:
   a data processing apparatus; and
   a memory coupled to the data processing apparatus having instructions stored thereon which, when executed by the data processing apparatus cause the data processing apparatus to perform operations comprising:
      receiving geographic information data from a database, the geographic information data comprising location points and being divided into geographic areas, at least some of the geographic areas containing one or more location points, at least some of the location points being associated with at least one category;
      calculating, by one or more processors, for at least some of the geographic areas, a total number of location points associated with each of a plurality of categories at a first level of specificity in a predetermined hierarchy of categories that defines relationships among categories, the categories in the hierarchy of categories arranged according to specificity where the first level of specificity is more specific than a second level of specificity in the hierarchy of categories;
      determining, by one or more processors, that none of the categories at the first level of specificity is a first dominant category based on each of the categories at the first level of specificity corresponding with a quantity of location points that is not greater than a first threshold percentage of location points associated with the respective geographic area;
      calculating, by one or more processors and based on determining that none of the categories at the first level of specificity is a first dominant category, for at least some of the geographic areas, a total number of location points associated with each of a plurality of categories at the second level of specificity in the hierarchy of categories;
      identifying, by one or more processors and based on determining that none of the categories at the first level of specificity is a first dominant category, a second dominant category at the second level of specificity based on the location points associated with each of the categories at the second level of specificity, the second dominant category from the categories at the second level of specificity and corresponding with a quantity of location points greater than a second threshold percentage of location points associated with the respective geographic area; and
      storing the second dominant category in association with the respective geographic area in the database.

8. The system of claim 7, wherein calculating a total number of location points associated with each of a plurality of categories at the second level of specificity comprises weighting each location point based on a prominence score associated with each respective location point.

9. The system of claim 7, wherein calculating a total number of location points associated with each of a plurality of categories at the second level of specificity comprises weighting each location point based on a category associated with the location point, the category identified as a category of interest to a user to whom the geographic information is to be displayed.

10. The system of claim 7, the operations further comprising
choosing geographic information to display to a user, the geographic information representing a geographic location within a first geographic area; and
choosing a content item for display to the user based at least in part on the dominant category associated with the first geographic area.

11. The system of claim 7, wherein some of the geographic areas are contained within some of the other of the geographic areas, and the operations further comprising assigning the dominant category of a first geographic area to a second geographic area contained within the first geographic area.

12. The system of claim 7, wherein the second threshold percentage is sixty percent.

13. One or more computer readable storage devices storing software comprising instructions executable by a processing device and upon such execution cause the processing device to perform operations comprising:
receiving geographic information data from a database, the geographic information data comprising location points and being divided into geographic areas, at least some of the geographic areas containing one or more location points, at least some of the location points being associated with at least one category;
calculating, by one or more processors, for at least some of the geographic areas, a total number of location points associated with each of a plurality of categories at a first level of specificity in a predetermined hierarchy of categories that defines relationships among categories, the categories in the hierarchy of categories arranged according to specificity where the first level of specificity is more specific than a second level of specificity in the hierarchy of categories;
determining, by one or more processors, that none of the categories at the first level of specificity is a first dominant category based on each of the categories at the first level of specificity corresponding with a quantity of location points that is not greater than a first threshold percentage of location points associated with the respective geographic area;
calculating, by one or more processors and based on determining that none of the categories at the first level of specificity is a first dominant category, for at least some of the geographic areas, a total number of location points associated with each of a plurality of categories at the second level of specificity in the hierarchy of categories;
identifying, by one or more processors and based on determining that none of the categories at the first level of specificity is a first dominant category, a second dominant category at the second level of specificity based on the location points associated with each of the categories at the second level of specificity, the second dominant category from the categories at the second level of specificity and corresponding with a quantity of location points greater than a second threshold percentage of location points associated with the respective geographic area; and
storing the second dominant category in association with the respective geographic area in the database.

14. The computer readable storage devices of claim 13, wherein calculating a total number of location points associated with each of a plurality of categories at the second level of specificity comprises weighting each location point based on a prominence score associated with each respective location point.

15. The computer readable storage devices of claim 13, wherein calculating a total number of location points associated with each of a plurality of categories at the second level of specificity comprises weighting each location point based on a category associated with the location point, the category identified as a category of interest to a user to whom the geographic information is to be displayed.

16. The computer readable storage devices of claim 13, the operations further comprising
choosing geographic information to display to a user, the geographic information representing a geographic location within a first geographic area; and
choosing a content item for display to the user based at least in part on the dominant category associated with the first geographic area.

17. The computer readable storage devices of claim 13, wherein some of the geographic areas are contained within some of the other of the geographic areas, and the operations further comprising assigning the dominant category of a first geographic area to a second geographic area contained within the first geographic area.

18. The computer readable storage devices of claim 13, wherein the second threshold percentage is sixty percent.

* * * * *